US012199255B2

United States Patent
Ganapatibhotla et al.

(10) Patent No.: US 12,199,255 B2
(45) Date of Patent: Jan. 14, 2025

(54) CURABLE COMPOSITIONS COMPRISING POLYOL COMPONENT, FUNCTIONAL BUTADIENE COMPONENT, AND THERMALLY CONDUCTIVE FILLER, ARTICLES THEREFROM, AND METHODS OF MAKING AND USING SAME

(71) Applicant: 3M INNOVATIVE PROPERTIES COMPANY, St. Paul, MN (US)

(72) Inventors: Lalitha V. N. R. Ganapatibhotla, Lake Elmo, MN (US); Michael A. Kropp, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 747 days.

(21) Appl. No.: 17/294,012

(22) PCT Filed: Nov. 15, 2019

(86) PCT No.: PCT/IB2019/059830
§ 371 (c)(1),
(2) Date: May 14, 2021

(87) PCT Pub. No.: WO2020/100102
PCT Pub. Date: May 22, 2020

(65) Prior Publication Data
US 2022/0006137 A1 Jan. 6, 2022

Related U.S. Application Data

(60) Provisional application No. 62/768,709, filed on Nov. 16, 2018.

(51) Int. Cl.
*H01M 10/6551* (2014.01)
*B32B 7/12* (2006.01)
(Continued)

(52) U.S. Cl.
CPC .......... *H01M 10/6551* (2015.04); *B32B 7/12* (2013.01); *B32B 9/04* (2013.01); *B32B 9/041* (2013.01);
(Continued)

(58) Field of Classification Search
CPC .......... H01M 10/6551; H01M 10/209; H01M 10/244; B32B 7/12; B32B 9/04;
(Continued)

(56) References Cited

U.S. PATENT DOCUMENTS 3,624,012 A * 11/1971 Case .................... C08G 18/686
524/750
4,857,563 A 8/1989 Croft et al.
(Continued)

FOREIGN PATENT DOCUMENTS

CN 101235277 8/2008
EP 3352290 7/2018
(Continued)

OTHER PUBLICATIONS

Oxford English Dictionary, s.v. "maleinized (adj.)," Sep. 2023, https://doi.org/10.1093/OED/4287040504. (Year: 2023).*
(Continued)

*Primary Examiner* — Sean P Cullen
(74) *Attorney, Agent, or Firm* — Carlos M. Téllez Rodríguez; 3M Innovative Properties Co

(57) ABSTRACT

A curable composition includes a polyol component comprising one or more polyols: a functional butadiene component; and a thermally conductive filler. The thermally conductive filler is present in an amount of at least 20 wt. %, based on the total weight of the curable composition. The curable composition has, upon curing, a thermal conductivity of at least 0.5 W/(mK).

18 Claims, 2 Drawing Sheets

(51) Int. Cl.

| | |
|---|---|
| *B32B 9/04* | (2006.01) |
| *B32B 15/04* | (2006.01) |
| *B32B 15/08* | (2006.01) |
| *B32B 27/08* | (2006.01) |
| *C09J 5/00* | (2006.01) |
| *C09J 11/04* | (2006.01) |
| *C09J 115/00* | (2006.01) |
| *C09K 5/14* | (2006.01) |
| *H01M 50/209* | (2021.01) |
| *H01M 50/244* | (2021.01) |

(52) U.S. Cl.
CPC ............ *B32B 9/045* (2013.01); *B32B 15/043* (2013.01); *B32B 15/08* (2013.01); *B32B 27/08* (2013.01); *C09J 5/00* (2013.01); *C09J 11/04* (2013.01); *C09J 115/00* (2013.01); *C09K 5/14* (2013.01); *H01M 50/209* (2021.01); *H01M 50/244* (2021.01); *B32B 2250/02* (2013.01); *B32B 2307/54* (2013.01); *B32B 2457/10* (2013.01); *C09J 2400/166* (2013.01); *C09J 2415/00* (2013.01)

(58) Field of Classification Search
CPC ....... B32B 9/041; B32B 15/043; B32B 15/08; B32B 27/08; C09J 5/00; C09J 11/04; C09J 115/00; C09K 5/14
USPC .......................................... 429/120, 156, 159
See application file for complete search history.

(56) References Cited

U.S. PATENT DOCUMENTS

| | | | |
|---|---|---|---|
| 4,985,475 A | 1/1991 | Croft et al. | |
| 5,169,716 A | 12/1992 | Croft et al. | |
| 5,792,816 A | 8/1998 | Abend | |
| 5,989,459 A * | 11/1999 | Nguyen | C08F 279/02 |
| | | | 524/439 |
| 6,238,596 B1 | 5/2001 | Nguyen | |
| 2006/0156955 A1* | 7/2006 | Takashima | C08L 101/00 |
| | | | 106/287.22 |
| 2006/0247355 A1* | 11/2006 | Kosaka | C08K 3/34 |
| | | | 524/439 |
| 2013/0095326 A1 | 4/2013 | Tasaka et al. | |
| 2015/0197680 A1 | 7/2015 | Frank | |
| 2016/0024352 A1* | 1/2016 | Jozuka | C09J 7/30 |
| | | | 428/192 |
| 2017/0130014 A1* | 5/2017 | Anyaogu | F16G 5/08 |
| 2017/0346143 A1* | 11/2017 | Deser | H01M 10/613 |

FOREIGN PATENT DOCUMENTS

| | | | | |
|---|---|---|---|---|
| JP | 2-212580 A | 8/1990 | | |
| JP | 2-296821 A | 12/1990 | | |
| JP | 3-43481 | 2/1991 | | |
| JP | 3-43481 A | 2/1991 | | |
| JP | 2008115356 A * | 5/2008 | ......... | C08G 18/6208 |
| JP | 2009-132786 A | 6/2009 | | |
| JP | 4848782 | 12/2011 | | |
| JP | 4967761 | 7/2012 | | |
| JP | 6108023 B1 * | 4/2017 | ............. | C09J 11/06 |
| WO | WO 2008/044523 A1 | 4/2008 | | |
| WO | WO 2011/019719 | 2/2011 | | |
| WO | WO 2011/158362 | 12/2011 | | |

OTHER PUBLICATIONS

Cray Valley, Liquid Polybutadiene Resins, 2024, Cray Valley, 1-13 (Year: 2024).*
Stripe, D., Bonding to Brass with Zetpol HNBR & Zeoforte ZSC, Oct. 2017, ZEON, 1-54 (Year: 2017).*
Cray Valley, Product Guide, Jan. 2015, Total Cray Valley, 1-11 (Year: 2015).*
Shinbo, "A Handbook of Epoxy Resin", 1987, Nikkan Kogyo Shinbun Ltd.
"Aluminium Hydroxide," Wikipedia, [retrieved from the internet on Apr. 20, 2021], URL: <https://en.wikipedia.org/wiki/Aluminium_hydroxide>, (date unknown but believed to be prior to the date of the filing of the present application), 7 pages.
Blank, "Catalysis of the Epoxy-Carboxyl Reaction," Presented at the International Waterborne, High-Solids and Powder Coatings Symposium, Feb. 21-23, 2001, New Orleans, LA USA, 18 pages.
Mee, "Thermoreversible Covalent Crosslinking of Maleated Ethylene/Propylene Copolymers with Diols," Journal of Polymer Science: Part A: Polymer Chemistry, 2008, vol. 46, pp. 1810-1825.
"Polybutadiene," Wikipedia, [retrieved from the internet on Apr. 21, 2021], URL: <https://en.wikipedia.org/wiki/Polybutadiene>, (date unknown but believed to be prior to the date of the filing of the present application), 9 pages.
Sun, "Thermoreversible Cross-Linking of Maleated Ethylene/Propylene Copolymers Using Hydrogen-Bonding and Ionic Interactions," Macromolecules, 2006, vol. 39, No. 9, pp. 3441-3449.
International Search Report for PCT International Application No. PCT/IB2019/059830, mailed on May 12, 2020, 2 pages.

* cited by examiner

CURABLE COMPOSITIONS COMPRISING POLYOL COMPONENT, FUNCTIONAL BUTADIENE COMPONENT, AND THERMALLY CONDUCTIVE FILLER, ARTICLES THEREFROM, AND METHODS OF MAKING AND USING SAME

CROSS REFERENCE TO RELATED APPLICATIONS

This application is a national stage filing under 35 U.S.C. 371 of PCT/IB2019/059830, filed Nov. 15, 2019, which claims the benefit of U.S. Provisional Application No. 62/768,709, filed Nov. 16, 2018, the disclosures of which are incorporated by reference in their entireties herein.

FIELD

The present invention generally relates to curable compositions. The curable compositions may be used, for example, as thermally conductive gap fillers, which may be suitable for use in electronics applications such as battery assemblies.

BACKGROUND

Curable compositions useful as thermally conductive gap fillers have been disclosed in the art. Such curable compositions are described in, for example, EP 3352290, JP 4848782, CN 101235277, and WO 2011/019719.

SUMMARY

In some embodiments, a curable composition is provided. The curable composition includes a polyol component comprising one or more polyols; a functional butadiene component; and a thermally conductive filler. The thermally conductive filler is present in an amount of at least 20 wt. %, based on the total weight of the curable composition. The curable composition has, upon curing, a thermal conductivity of at least 0.5 W/(mK).

It should be understood that numerous other modifications and embodiments can be devised by those skilled in the art, which fall within the scope and spirit of the principles of the disclosure. All scientific and technical terms used herein have meanings commonly used in the art unless otherwise specified. The definitions provided herein are to facilitate understanding of certain terms used frequently herein and are not meant to limit the scope of the present disclosure. As used in this specification and the appended claims, the singular forms "a", "an", and "the" encompass embodiments having plural referents, unless the context clearly dictates otherwise. As used in this specification and the appended claims, the term "or" is generally employed in its sense including "and/or" unless the context clearly dictates otherwise.

DETAILED DESCRIPTION

Figure 1:
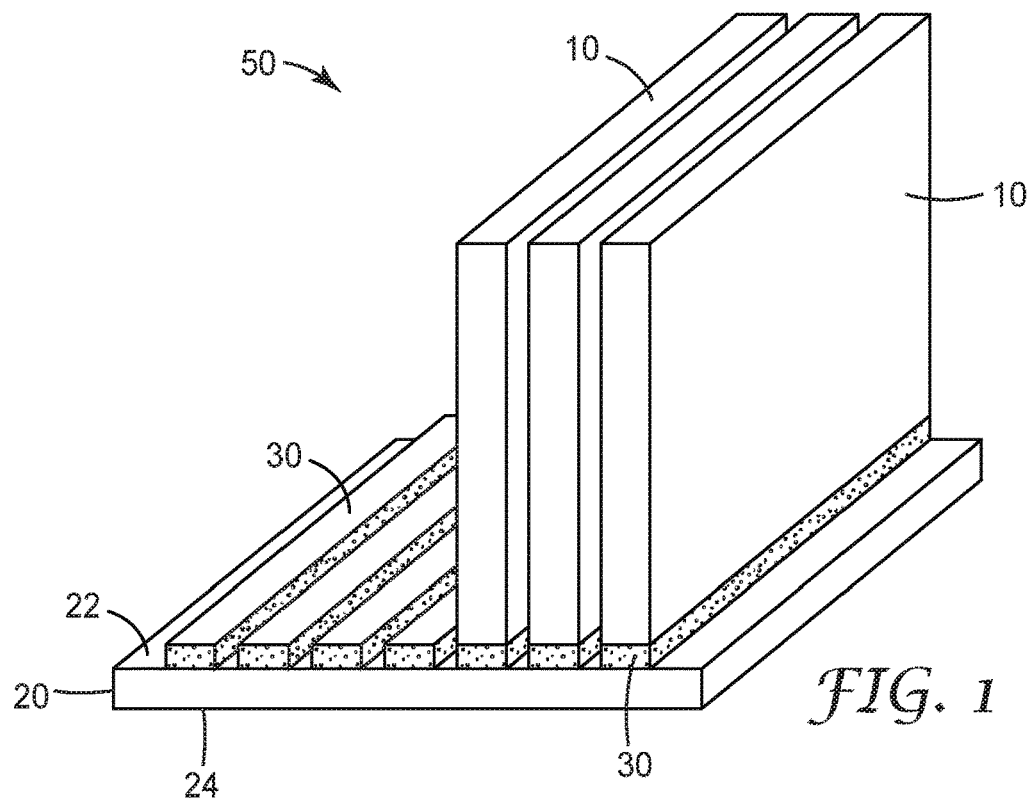
FIG. 1 illustrates the assembly of an exemplary battery module according to some embodiments of the present disclosure.

Thermal management plays an important role in many electronics applications such as, for example, electric vehicle (EV) battery assembly, power electronics, electronic packaging, LED, solar cells, electric grid, and the like. Certain thermally conductive materials (e.g., adhesives) may be an attractive option for these applications due to good electrical insulative properties, feasibility in processing for integrated parts or complex geometries, and good conformability/wettability to different surfaces, especially the ability to efficiently dissipate the heat away while having good adhesion to different substrates for assembly.

Regarding applications in EV battery assemblies, currently, one such application that utilizes a thermally conductive material is the gap filler application. Generally, requirements for the gap filler application include high thermally conductivity, good overlap shear adhesion strength, good tensile strength, good elongation at break for toughness, and good damping performance, having low viscosity/high pourability before curing, and being reworkable in the event that a battery assembly needs to be replaced during the useful life of the EV. However, to achieve high thermal conductivity, typically, a large amount of inorganic thermally conductive filler is added to the composition. The high loading of thermally conductive fillers, however, has a deleterious impact on adhesion performance, toughness, damping performance, and viscosity.

Many current compositions employed in the EV thermal adhesive gap filler application are based on polyurethane curing chemistries. While these polyurethane based materials, at high filler loadings, exhibit many beneficial properties, these materials have poor stability at elevated temperatures and the isocyanates used in such products pose safety concerns.

Silicone containing compositions are also employed in the EV thermal adhesive gap filler application. Such materials, however, are slow to cure and are not compatible with many components in batteries (e.g., foams, polyesters, aluminum).

Alternatives to polyurethane and silicone-based compositions have also been developed, such as flexible epoxy-amine and epoxy-thiol compositions Such compositions have proven to be inadequate at least because at high filler loadings, they exhibit inadequate reworkability, pourability, or elongation properties. Moreover, many of such compositions are not compatible with certain common low-cost, flame retardant filler materials.

In order to solve the above-discussed performance problems and safety concerns, a curable composition providing a good balance of the above-described desirable properties has been discovered. More specifically, the filled compositions of the present disclosure, in addition to having good and tunable thermally conductivity, overlap shear adhesion strength, tensile strength, elongation at break for toughness, and damping performance, the curable compositions also exhibit reworkability, pourability within a broad temperature range, and are compatible with broad classes of filler materials. Additionally, the curable compositions of the present disclosure do not need to be based on polyurethane curing chemistries or include silicone. Still further, the curable compositions can be formed from natural/plant based raw materials.

As used herein:

The term "room temperature" refers to a temperature of 22° C. to 25° C.

The terms "cure" and "curable" refer to joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility, but may be swellable in the presence of an appropriate solvent.

The term "unfilled composition" refers to all components of a composition other than thermally conductive filler components.

The term "backbone" refers to the main continuous chain of a polymer.

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of "alkylene" groups include methylene, ethylene, 1,3-propylene, 1,2-propylene, 1,4-butylene, 1,4-cyclohexylene, and 1,4-cyclohexyldimethylene.

The term "alkenyl" refers to an unsaturated branched, straight chain, or cyclic hydrocarbon radical having at least one carbon-carbon double bond. The radical may be in either the cis or trans conformation about the double bond(s). Typical alkenyl groups include, but are not limited to, ethenyl, propenyl, isopropenyl, butenyl, isobutenyl, tert-butenyl, pentenyl, hexenyl and the like. Unless otherwise indicated, the alkenyl group typically has 1 to 30 carbon atoms. In some embodiments, the alkenyl group has 1 to 20 carbon atoms, 1 to 10 carbon atoms, 1 to 6 carbon atoms, or 1 to 4 carbon atoms.

The term "aromatic" refers to C3-C40, suitably C3-C30, aromatic groups including both carbocyclic aromatic groups as well as heterocyclic aromatic groups containing one or more of the heteroatoms, O, N, or S, and fused ring systems containing one or more of these aromatic groups fused together.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and, optionally, carbocyclic. The arylene has at least one aromatic ring. Optionally, the aromatic ring can have one or more additional carbocyclic rings that are fused to the aromatic ring. Any additional rings can be unsaturated, partially saturated, or saturated. Unless otherwise specified, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term (meth)acrylate means acrylate or methacrylate.

Repeated use of reference characters in the specification is intended to represent the same or analogous features or elements of the disclosure. As used herein, the word "between", as applied to numerical ranges, includes the endpoints of the ranges, unless otherwise specified. The recitation of numerical ranges by endpoints includes all numbers within that range (e.g. 1 to 5 includes 1, 1.5, 2, 2.75, 3, 3.80, 4, and 5) and any range within that range.

In some embodiments, the present disclosure provides a filler loaded thermally conductive curable composition, formulated by blending at least a polyol component and a functional butadiene component.

In some embodiments, the curable compositions may include a polyol component that includes one or more polyols such as one or more polyols that include two or more primary or secondary aliphatic hydroxyl groups (that is, the hydroxyl group is bonded directly to a non-aromatic carbon atom). The hydroxyl groups of the polyols may be terminally situated, or may be pendant from a polymer or copolymer. In some embodiments, the polyols may include any polyol that is compatible with the functional butadiene component (i.e., does not phase separate when mixed with).

In some embodiments, the polyols may include monomeric polyols. Representative examples of useful monomeric polyols include alkylene glycols (for example, 1,2-ethanediol, 1,3-propanediol, 1,4-butanediol, 1,5-pentanediol, 1,6-hexanediol, 2-ethyl-1,6-hexanediol, 1,4-cyclohexane dimethanol, 1,18-dihydroxyoctadecane, and 3-chloro-1,2-propanediol), polyhydroxyalkanes (for example, glycerine, trimethylolethane, pentaerythritol, and sorbitol) and other polyhydroxy compounds such as, castor oil, and the like.

In some embodiments, the polyols may include one or more dimer diols, one or more trimer triols, or combinations thereof.

In some embodiments, suitable dimer diols may include at least one alkyl or alkenyl group and be characterized by having two hydroxyl groups. The dimer diols may be saturated or unsaturated. The dimer diols may be relatively high molecular weight and be made up of mixtures comprising various ratios of a variety of large or relatively high molecular weight diols. Component structures may be acyclic, cyclic (e.g., monocyclic or bicyclic), or aromatic. In some embodiments, suitable commercially available dimer diols are available under the trade designation Pripol™ 2033 from Croda.

In some embodiments, suitable trimer triols may include at least one alkyl or alkenyl group and be characterized by having three hydroxyl groups. The trimer triols may be saturated or unsaturated. The trimer triols may be relatively high molecular weight and be made up of mixtures comprising various ratios of a variety of large or relatively high molecular weight triols. Component structures may be acyclic, cyclic (e.g., monocyclic or bicyclic), or aromatic. In some embodiments, suitable commercially available trimer triols are available under the trade designation Tone™ 0301 Polyol from DowDuPont.

In some embodiments, other high molecular weight diols for the polyols may include polybutadiene diols and hydrogenated polybutadienediols, such as G-1000, GI-1000 from Nippon Soda Co. and Krasol® F3000, and Krasol® F3100 from Total.

In some embodiments, the number average molecular weight of the polyols may be between 100 g/mol and 3000 g/mol, between 250 g/mol and 2000 g/mol, or between 400 g/mol and 1000 g/mol. In some embodiments, the number of carbon atoms in the polyols may be between from 12 to 100, between from 20 to 100, between from 30 to 100, between from 12 to 80, between from 20 to 80, between from 30 to 80, between from 12 to 60, between from 20 to 60, or between from 30 to 60.

In some embodiments, the polyol component may further include one or more monofunctional alcohols. In some embodiments, suitable monofunctional alcohols may include alkyl, alkylene, alkynyl, aromatic, heteroaromatic, branched, unbranched, substituted, and unsubstituted alcohols, alkoxylated products of alkyl-alcohols, alkyl ester alcohols and mixtures thereof. In some embodiments, the monofunctional alcohols may include an alkyl alcohol having from 4 to 18 carbon atoms, from 8 to 16 carbon atoms, or from 12 to 16 carbon atoms, and a molecular weight of from 74 g/mol to 1000 g/mol, or from 130 g/mol to 500 g/mol.

In some embodiments, the functional butadiene component may include any functional butadiene capable of reacting with the polyols of the polyol component. In some embodiments, the functional butadiene component may be of the following general structural formula:

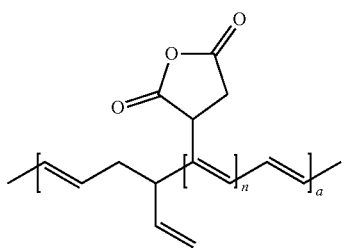

where a is 30 to 150, or 30 to 120; and n is 1 to 30, or 2 to 15.

In some embodiments, the functional butadiene component may be made up of a mixture of functional butadienes having a variety of molecular weights.

In some embodiments, the functional butadiene component may include malenized polyalkyldienes, maleated liquid rubber, maleated liquid isoprene, liquid polyfarnescene, maleated styrene-butadiene rubber (SBR), or combinations thereof. In some embodiments, the functional butadiene component may include or consist essentially of maleated polybutadienes such as, for example, the Ricon® series of maleated butadienes available from Cray Valley.

In some embodiments, the curable compositions of the present disclosure may include reactive and non-reactive diluents that are compatible with the functional butadiene component. Examples of reactive diluents may include maleated soybean oil, dodecynyl succinic anhydride, octenyl succinic anhydride, octadecynyl succinic anhydride. Examples of non-reactive diluents include liquid butadienes (eg: Ricon® 130, Ricon® 131, Ricon® 134 from Cray Valley), soybean oil, hydrogenated petroleum distillates, or other vegetable oils that are compatible with the functional butadiene component.

In some embodiments, the curable compositions of the present disclosure may include one or more resins capable of reacting with the acid of the acid/ester formed when the alcohol (of the polyols or monofuntional alcohols) reacts with the functional butadiene component (e.g., a maleic anhydride group). Suitable resins of this type may include epoxidized vegetable oils, epoxided fatty acid esters, or epoxided alpha olefins and epoxidized polybutenes. Commercially available examples of these resins include Vikoflex® 5075, Vikoflex® 7170, Vikoflex® 7190, Vikolox® 16, and Vikopol® 24, all available from Arkema.

In some embodiments, the resins may be incorporated into the curable compositions via either or both of the polyol and functional butadiene components. Alternatively, the resins may be incorporated into the curable compositions after the polyol and functional butadiene components are combined. In any event, the resins may be present in the curable composition in an amount of between 0.1 and 10 wt. %, between 0.5 and 5 wt. %, or between 1 and 3 wt. %, based on the total weight of the filled curable composition.

In some embodiments, the curable compositions of the present disclosure may include one or more thermally conductive fillers. Any known thermally conductive fillers may be used, although electrically insulating fillers may be preferred where breakthrough voltage is a concern. Suitable electrically insulating, thermally conductive fillers may include ceramics such as oxides, hydroxides, oxyhydroxides, silicates, borides, carbides, and nitrides. Suitable ceramic fillers include, e.g., silicon oxide (e.g, fused silica), aluminum oxide, aluminum trihydroxide (ATH), boron nitride, silicon carbide, and beryllium oxide. In some embodiments, the thermally conductive fillers may include or consist essentially of ATH. It is to be appreciated that while ATH is not generally used in many common thermal management materials because of its reactivity with certain species and the resultant formulation difficulties, the curable compositions of the present disclosure are able to incorporate such inorganic fillers without drawback. In some embodiments, the thermally conductive filler includes fused silica. Other thermally conducting fillers include carbon-based materials such as graphite and metals such as aluminum, copper, gold, and silver.

Thermally conductive filler particles are available in numerous shapes, e.g. spheres, irregular, platelike, & acicular. Through-plane thermal conductivity may be important in certain applications. Therefore, in some embodiments, generally symmetrical (e.g., spherical or semi-spherical) fillers may be employed. To facilitate dispersion and increase filler loading, in some embodiments, the thermally conductive fillers may be surface-treated or coated. Generally, any known surface treatments and coatings may be suitable, including those based on silane, titanate, zirconate, aluminate, and organic acid chemistries. In some embodiments, the thermally conductive filler particles may include silane surface treated particles (i.e., particles having surface-bonded organic silanes). For powder handling purposes, many fillers are available as polycrystalline agglomerates or aggregates with or without binder. To facilitate high thermal conductivity formulations, some embodiments may include mixtures of particles and agglomerates in various size and mixtures.

In some embodiments, the thermally conductive filler particles include spherical alumina, semispherical alumina, or irregular alumina. In some embodiments, the thermally conductive filler particles include spherical alumina and semispherical alumina.

The curable compositions of the present disclosure may include one or more fillers (e.g. thermally conductive inorganic fillers) in an amount of at least 25 wt. %, at least 35 wt. %, at least 45 wt. %, at least 50 wt. %, at least 55 wt. %, at least 60 wt. %, at least 70 wt. %, at least 80 wt. %, or at least 90 wt. %, based on the total weight of the filled curable composition. In some embodiments, filler loadings may be between 25 and 95 wt. %, between 35 and 90 wt. %, between 55 and 85 wt. %, or between 70 and 85 wt. %, based on the total weight of the filled curable composition.

In some embodiments, the curable compositions according to the present disclosure may include one or more dispersants. Generally, the dispersants may act to stabilize the inorganic filler particles in the composition-without dispersant, the particles may aggregate, thus adversely affecting the benefit of the particles in the composition. Suitable dispersants may depend on the specific identity and surface chemistry of filler. In some embodiments, suitable dispersants according to the present disclosure may include at least a binding group and a compatibilizing segment. The binding group may be ionically bonded to the particle surface. Examples of binding groups for alumina particles include phosphoric acid, phosphonic acid, sulfonic acid, carboxylic acid, and amine. In some embodiments, the dispersants may be present in the curable composition in an amount between 0.1 and 10 wt. %, 0.1 and 5 wt. %, 0.5 and 3 wt. %, or 0.5 and 2 wt. %, based on the total weight of the filled curable composition.

In some embodiments, the dispersant may be pre-mixed with the inorganic filler prior to incorporating into the curable compositions. Such pre-mixing may facilitate the filled systems behaving like Newtonian fluids or enable shear-thinning effects behavior.

In some embodiments, the curable compositions may include one or more rheology modifiers.

In some embodiments, the curable compositions according to the present disclosure may include one or more catalysts. Generally, the catalysts may act to accelerate the cure of the curable composition.

In some embodiments, the curable compositions may include an amine catalyst that can catalyze the reaction between the maleated butadiene and the polyol. The amine catalyst can be any compound including one to four basic nitrogen atoms that bear a lone pair of electrons. The amine catalyst can include primary, secondary, tertiary amine groups, or a combination thereof. The nitrogen atom(s) in the amine catalyst can be bonded to alkyl groups, aryl groups, arylalkylene groups, alkylarylene, alkylaryleneal-kylene groups, or a combination thereof. The amine catalyst can also be a cyclic amine, which can include one or more rings and can be aromatic or non-aromatic (e.g., saturated or unsaturated). One or more of the nitrogen atoms in the amine can be part of a carbon-nitrogen double bond. While in some embodiments, the amine catalyst includes only carbon-nitrogen, nitrogen-hydrogen, carbon-carbon, and carbon-hydrogen bonds, in other embodiments, the amine catalyst can include other functional groups (e.g., hydroxyl or ether group). However, it is understood by a person skilled in the art that a compound including a nitrogen atom bonded to a carbonyl group is an amide, not an amine, and has different chemical properties from an amine. The amine catalyst can include carbon atoms that are bonded to more than one nitrogen atom. Thus, the amine catalyst can be a guanidine or amidine. As would be understood by a person skilled in the art, a lone pair of electrons on one or more nitrogens of the amine catalyst distinguishes them from quaternary ammonium compounds, which have a permanent positive charge regardless of pH. The amine catalyst can include a combination of one or more amines as described above. In some embodiments, the amine catalyst comprises at least one of a tertiary amine, an amidine, an imidazole, or a guanidine.

Examples of useful amine catalysts include propylamine, butylamine, pentylamine, hexylamine, triethylamine, tris-(2-ethylhexyl)amine (TEHA), dimethylethanolamine, benzyldimethylamine, dimethylaniline, dimethylundecylamine, tribenzylamine, triphenylamine, tetramethylguanidine (TMG), 1,8-diazabicyclo[5.4.0]undec-7-ene (DBU), 1,5-diazabicyclo[4.3.0]non-5-ene (DBN), 1,4-diazabicyclo[2.2.2]octane (DABCO), quinuclidine, diphenylguanidine (DPG), dimethylaminomethyl phenol, tris(dimethylaminomethyl) phenol, tris(dimethylaminomethyl)phenol tri(2-ethylhexoate), dicyandiamide (DICY), and imidazoles (e.g., imidazole, 2-methylimidazole, 2-ethyl-4-methylimidazole, 2-phenylimidazole, 1-benzyl-2-methylimidazole), and combinations thereof. In some embodiments, the amine catalyst comprises at least one of tetramethylguanidine, diphenylguanidine, 1,4-diazabicyclo[2.2.2]octane, 1,8-diazabicyclo[5.4.0]undec-7-ene, or 1,5-diazabicyclo[4.3.0]non-5-ene.

The composition according to the present disclosure typically has an open time and cure time that can be useful for the assembly of battery modules and does not require heating above ambient conditions to cure.

For some applications, it can be useful to increase the open time of the composition of the present disclosure. To increase open time, in some embodiments, at least some of the amine catalyst is a latent amine or an amine that is phase-separated from the composition at ambient temperature. The phase-separated second amine may be present as a solid, present in a solid adduct, or segregated within a solid in the composition in which the reactive components are generally liquids.

In some embodiments, at least some of the amine is a solid within the composition. In these embodiments, the solid is insoluble in the composition at ambient temperature but dissolves in the composition at an elevated temperature (e.g., at least 50° C., 60° C., 70° C., 75° C., 80° C., 90° C., 95° C., or 100° C.). In some embodiments, the amine catalyst comprises dicyandiamide (DICY). In some embodiments, the amine catalyst comprises an adduct of an amine and an epoxy resin. The adduct can include any of the amines and any of the epoxy resins described above. Suitable adducts of amines and epoxy resins are commercially available, for example, from Hexion, Inc., Columbus, Ohio, under the trade designation "EPIKURE™" and from Ajinomoto Fine-Techno Co., Inc., Kawasaki, Japan, under the trade designation "AJICURE™".

In some embodiments, at least some of the amine catalyst is segregated within a solid in the composition. Such amine catalysts may be said to be encapsulated and can be made by any of a variety of micro-encapsulation techniques (e.g., coacervation, interfacial addition and condensation, emulsion polymerization, microfluidic polymerization, reverse micelle polymerization, air suspension, centrifugal extrusion, spray drying, prilling, pan coating, other processes, and any combination of these). The amine catalyst may be contained in one single cavity or reservoir within the solid or may be in numerous cavities within solid. The loading level of the amine catalyst may be 5% to 90%, 10% to 90%, or 30% to 90%, based on the total weight of the amine catalyst and solid. In these embodiments, the amine catalyst is segregated within the solid at ambient temperature but is released into the composition at an elevated temperature (e.g., at least 50° C., 60° C., 70° C., 75° C., 80° C., 90° C., 95° C., or 100° C.) when the solid at least partially melts. The time required to at least partially melt the solid may be up to 5, 4, 3, 2, or 1 minutes.

In some embodiments, the catalyst may include a Lewis acid, such as SnCl4 or para-toluenesulfonic acid.

In some embodiments, the curable compositions of the present disclosure may be provided (e.g., packaged) as a two-part composition, in which a first part includes the above-described polyol component and a second part includes the above described functional butadiene component. The other components of the curable compositions (e.g., fillers, crosslinkers, dispersants, catalysts, and the like), can be included in one or both of the first and second parts. The present disclosure further provides a dispenser comprising a first chamber and a second chamber. The first chamber comprises the first part, and the second chamber comprises the second part.

In addition to the above discussed additives, further additives can be included in one or both of the first and second parts. For example, any or all of antioxidants/stabilizers, colorants, abrasive granules, thermal degradation stabilizers, light stabilizers, conductive particles, tackifiers, flow agents, bodying agents, flatting agents, inert fillers, binders, blowing agents, fungicides, bactericides, surfactants, plasticizers, and other additives known to those skilled in the art. These additives, if present, are added in an amount effective for their intended purpose.

In some embodiments, the polyol component (not including any filler) may be present in the curable compositions of the present disclosure in an amount of between 0.1 and 20 wt. %, 0.5 and 10 wt. %, 1 and 8 wt. %, 1.5 and 5 wt. %, or 2 and 4 wt. %, based on the total weight of the filled curable composition. In some embodiments, the polyol component (not including any filler) may be present in the curable compositions of the present disclosure in an amount of at least wt. 0.1 wt. %, at least 0.5 wt. %, at least 1 wt. %, at least 1.5 wt. %, at least 2 wt. %, or at least 2.5 wt. %, based on the total weight of the filled curable composition. In some embodiments, the functional butadiene component (not including any filler) may be present in the curable compositions of the present disclosure in an amount of between 1 and 40 wt. %, 2 and 30 wt. %, 3 and 20 wt. %, or 4 and 10 wt. %, based on the total weight of the filled curable composition. In some embodiments, the functional butadiene component (not including any filler) may be present in the curable compositions of the present disclosure in an amount of at least 1 wt. %, at least 2 wt. %, at least 3 wt. %, or at least 4 wt. %, based on the total weight of the filled curable composition.

In some embodiments, the polyol and functional butadiene components may be present in the curable compositions based on stoichiometric ratios of the functional groups of the respective components.

In some embodiments, upon curing (i.e., the cured composition that is the reaction product of the curable composition), the curable compositions of the present disclosure may exhibit thermal, mechanical, and rheological properties that render the compositions particularly useful as thermally conductive gap fillers. It is believed that the curable compositions of the present disclosure provide an optimal blend of tensile strength, elongation at break, and overlap shear strength for certain EV battery assembly applications. Moreover, it is believed that the curable compositions of the present disclosure provide strong reworkability and pourability at customary operating temperatures and are compatible with certain common low-cost, flame retardant filler materials (e.g., ATH).

In some embodiments, the cured compositions may have an elongation at break that ranges from 0.1 to 200%, 0.5 to 175%, 1 to 160%, or 5 to 160%, with the pulling rate between 0.8 and 1.5 mm/min for fully cured systems (for purposes of the present application, elongation at break values are as measured in accordance with ASTM D638-03, "Standard Test Method for Tensile Properties of Plastics."); or at least 5%, at least 5.5%, at least 6%, at least 7%, at least 10%, at least 50%, at least 100%, or at least 150%, with the pulling rate between 0.8 and 1.5 mm/min for fully cured systems.

In some embodiments, the cured compositions may have an overlap shear strength on a bare aluminum substrate ranging from 1-30 $N/mm^2$, 2-30 $N/mm^2$, 1-25 $N/mm^2$, 4-20 $N/mm^2$, 6-20 $N/mm^2$, 2-16 $N/mm^2$, or 3-8 $N/mm^2$, for fully cured systems (for purposes of the present application, overlap sheer strength values are as measured on untreated aluminum substrates (i.e., aluminum substrates having no surface treatments or coatings other than native oxide layers) in accordance with EN 1465 Adhesives-Determination of tensile lap-shear strength of bonded assemblies. Additionally, it should be noted that in carrying out the overlap shear strength measurement, the cured compositions exhibited adhesive failure (as opposed to cohesive failure), indicating the ease of peeling the cured composition from an aluminum substrate.

In some embodiments, the cured compositions may have a tensile strength ranging from 0.5-16 $N/mm^2$, 1-10 $N/mm^2$, or 2-8 $N/mm^2$, with the pulling rate between 1 and 10% strain/min for fully cured systems (for purposes of the present application, tensile strength values are as measured in accordance with EN ISO 527-2 Tensile Test).

In some embodiments, the cured compositions are sufficiently "reworkable" in the sense that they can be used to adhere subsequent battery assemblies in the event that the original battery needs to be replaced during the useful life of the EV. In this regard, the cured compositions may have a peel strength of at least 0.01 N/mm on an aluminum substrate and at least 0.01 N/mm on a PET substrate. For purposes of the present application, peel strength is determined in accordance with ASTM D1876.

In some embodiments, within 10 minutes of mixing of the polyol component and the functional butadiene component, the viscosity of at least partially cured composition measured at room temperature may range from 100 to 50000 poise, and at 60° C. may range from 100 to 50000 poise. Further regarding viscosity, the viscosity of the polyol component (prior to mixing and including any filler) measured at room temperature may range from 100 to 100000 poise, and at 60° C. may range from 10 to 10000 poise; and the viscosity of the functional butadiene composition (prior to mixing and including any filler) measured at room temperature may range from 100 to 100000 poise, and at 60° C. may range from 10 to 10000 poise. For purposes of the present application, viscosity values are as measured using a 40 mm parallel-plate geometry at 1% strain on a ARES Rheometer (TAR Instruments, Wood Dale, IL, US) equipped with a forced convection oven accessory, at angular frequencies ranging from 10-500 rad/s.

In some embodiments, the curable compositions may have a cure rate in the range of 10 minutes to 240 hours, 30 minutes to 72 hours, or 1 to 24 hours for complete curing at room temperature or 10 minutes to 6 hours, 10 minutes to 3 hours, or 30 minutes to 60 minutes for complete curing at 100° C., or 1 to 24 hours for complete curing at room temperature or 10 minutes to 6 hours, 10 minutes to 3 hours, or 30 minutes to 60 minutes for complete curing at 120° C.

In some embodiments, the compositions may have a green strength cure rate, at room temperature of less than 10 minutes, less than 11 minutes, less than 15 minutes, less than 20 minutes, or less than 30 minutes. For purposes of the present application, the green strength cure rate may be approximated in terms of the overlap shear strength build-up rate. In this regard, in some embodiments, upon a 10 minute cure at room temperature, the compositions may have an overlap shear strength of at least 0.2 MPa, at least 0.3 MPa, at least 0.5 MPa, or at least 0.8 MPa. For purposes of the present application, overlap shear strength values are as measured in accordance with EN 1465.

In some embodiments, upon curing, the curable compositions of the present disclosure may have a thermal conductivity ranging from 1 to 5 W/(m*K), 1 to 2 W/(m*K), or 1.4 to 1.8 W/(m*k); or at least 0.5 W/(m*K), or at least 1 W/(m*K). For purposes of the present application, thermal conductivity values are as determined by, first, measuring diffusivity according to ASTM E1461-13, "Standard Test Method for Thermal Diffusivity by the Flash Method" and, then, calculating thermal conductivity from the measured thermal diffusivity, heat capacity, and density measurements according the formula:

$k = \alpha \cdot cp \cdot \rho$, where k is the thermal conductivity in W/(m K), $\alpha$ is the thermal diffusivity in $mm^2/s$, cp is the specific heat capacity in J/K-g, and $\rho$ is the density in $g/cm^3$. The sample thermal diffusivity can be measured using a Netzsch LFA 467 "HYPERFLASHX" directly and relative to standard, respectively, according to ASTM E1461-13. Sample density can be measured using geometric methods, while the specific heat capacity can be measured using Differential Scanning Calorimetry.

The present disclosure is further directed to methods of making the above-described curable compositions. In some embodiments, the curable compositions of the present disclosure may be prepared by, first, mixing the components of the polyol component (including filler and any additives) and, separately, mixing the components of the functional butadiene component (including filler and any additives). The components of both the polyol and functional butadiene components may be mixed using any conventional mixing technique, including by use of a speed mixer. In embodiments in which dispersants are employed, the dispersant may be pre-mixed with the filler prior to incorporating into the composition. Next, the polyol and functional butadiene components may be mixed using any conventional mixing technique to form the curable composition.

In some embodiments, the curable compositions of the present disclosure may be capable of curing without the use of catalyst or other cure agents. Generally, the curable compositions may cure at typical application conditions, e.g., at room temperature without the need for elevated temperatures or actinic radiation (e.g., ultraviolet light). In some embodiments, the first curable compositions cure at no greater than room temperature. In some embodiments, flash heating can be used, (e.g, IR light).

In some embodiments, the curable compositions of the present disclosure may be provided as a two-part composition. Generally, the two components of a two-part composition may be mixed prior to being applied to the substrates to be bonded. After mixing, the two-part composition may reach a desired handling strength, and ultimately achieve a desired final strength. Applying the curable composition can be carried out, for example, by dispensing the curable composition from a dispenser comprising a first chamber, a second chamber, and a mixing tip, wherein the first chamber comprises the first part, wherein the second chamber comprises the second part, and wherein the first and second chambers are coupled to the mixing tip to allow the first part and the second part to flow through the mixing tip.

The curable compositions of the present disclosure may be useful for coatings, shaped articles, adhesives (including structural and semi-structural adhesives), magnetic media, filled or reinforced composites, caulking and sealing compounds, casting and molding compounds, potting and encapsulating compounds, impregnating and coating compounds, conductive adhesives for electronics, protective coatings for electronics, as primers or adhesion-promoting layers, and other applications that are known to those skilled in the art. In some embodiments, the present disclosure provides an article comprising a substrate, having a cured coating of the curable composition thereon.

In some embodiments, the curable composition may function as a structural adhesive, i.e. the curable composition is capable of bonding a first substrate to a second substrate, after curing. Generally, the bond strength (e.g. peel strength, overlap shear strength, or impact strength) of a structural adhesive continues to build well after the initial cure time. In some embodiments, the present disclosure provides an article comprising a first substrate, a second substrate and a cured composition disposed between and adhering the first substrate to the second substrate, wherein the cured composition is the reaction product of the curable composition according to any one of the curable compositions of the present disclosure. In some embodiments, the first and/or second substrate may be at least one of a metal, a ceramic and a polymer, e.g. a thermoplastic.

The curable compositions may be coated onto substrates at useful thicknesses ranging from 5 microns to 10000 microns, 25 micrometers to 10000 micrometers, 100 micrometers to 5000 micrometers, or 250 micrometers to 1000 micrometers. Useful substrates can be of any nature and composition, and can be inorganic or organic. Representative examples of useful substrates include ceramics, siliceous substrates including glass, metal (e.g., aluminum or steel), natural and man-made stone, woven and nonwoven articles, polymeric materials, including thermoplastic and thermosets, (such as polymethyl (meth)acrylate, polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood; and composites of the foregoing materials.

In another aspect, the present disclosure provides a coated article comprising a metal substrate comprising a coating of the uncured, partially cured or fully cured curable composition on at least one surface thereof. If the substrate has two major surfaces, the coating can be coated on one or both major surfaces of the metal substrate and can comprise additional layers, such as bonding, tying, protective, and topcoat layers. The metal substrate can be, for example, at least one of the inner and outer surfaces of a pipe, vessel, conduit, rod, profile shaped article, sheet or tube.

Figure 2:
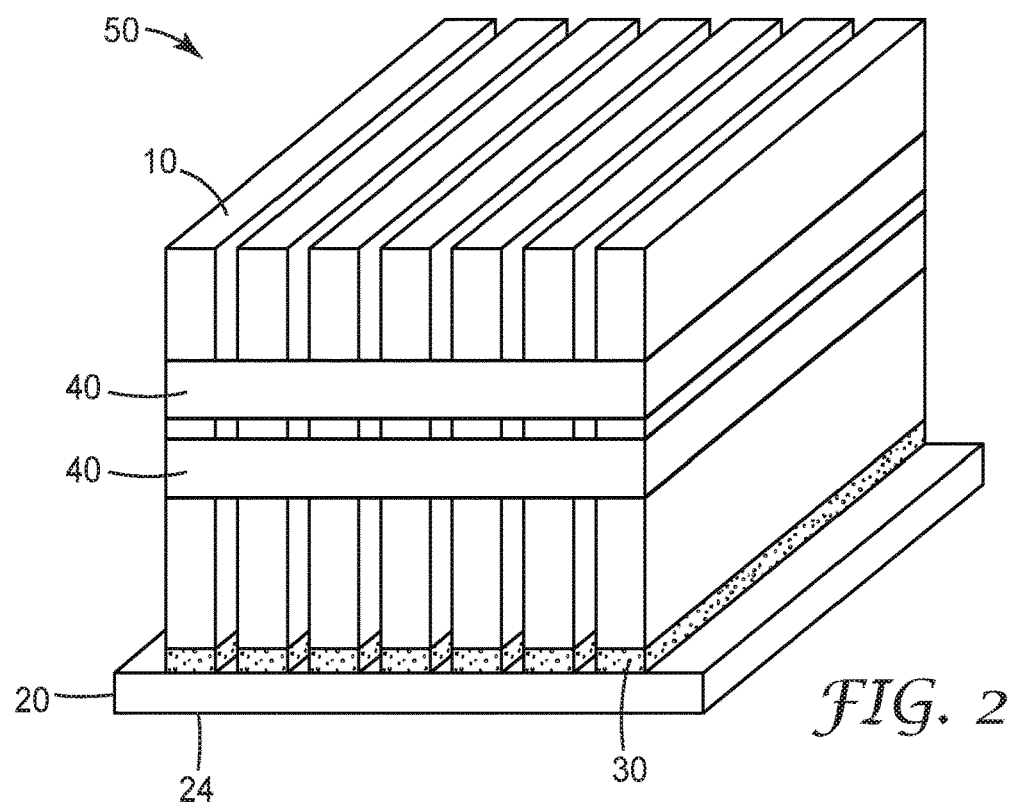
FIG. 2 illustrates the assembled battery module corresponding to FIG. 1.

In some embodiments, the present disclosure is further directed to a battery module that includes the uncured, partially cured or fully cured curable compositions of the present disclosure. Components of a representative battery module during assembly are shown in FIG. 1, and an assembled battery module is shown in FIG. 2. Battery module 50 may be formed by positioning a plurality of battery cells 10 on first base plate 20. Generally, any known battery cell may be used including, e.g., hard case prismatic cells or pouch cells. The number, dimensions, and positions of the cells associated with a particular battery module may be adjusted to meet specific design and performance requirements. The constructions and designs of the base plate are well-known, and any base plate (typically metal base plates made of aluminum or steel) suitable for the intended application may be used.

Battery cells 10 may be connected to first base plate 20 through first layer 30 of a first curable composition according to any of the embodiments of the present disclosure. First layer 30 of the curable composition may provide first level thermal management where the battery cells are assembled in a battery module. As a voltage difference (e.g., a voltage difference of up to 2.3 Volts) is possible between the battery cells and the first base plate, breakthrough voltage may be an important safety feature for this layer. Therefore, in some embodiments, electrically insulating fillers like ceramics (typically alumina and boron nitride) may be preferred for use in the curable compositions.

In some embodiments, first layer 30 may comprise a discrete pattern of the first curable composition applied to first surface 22 of first base plate 20, as shown in FIG. 1. For example, a pattern of the material to the desired lay-out of the battery cells may be applied, e.g., robotically applied, to the surface of the base plate. In some embodiments, the first layer may be formed as a coating of the first curable composition covering all or substantially all of the first surface of the first base plate. In alternative embodiments, the first layer may be formed by applying the curable composition directly to the battery cells and then mounting them to the first surface of the first base plate.

In some embodiments, the curable composition may need to accommodate dimensional variations of up to 2 mm, up to 4 mm, or even more. Therefore, in some embodiments, the first layer of the first curable composition may be at least 0.05 mm thick, e.g., at least 0.1 mm, or even at least 0.5 mm thick. Higher breakthrough voltages may require thicker layers depending on the electrical properties of the material, e.g., in some embodiments, at least 1, at least 2, or even at least 3 mm thick. Generally, to maximize heat conduction through the curable composition and to minimize cost, the curable composition layer should be as thin as possible, while still ensure good contact with the heat sink. Therefore, in some embodiments, the first layer is no greater than 5 mm thick, e.g., no greater than 4 mm thick, or even no greater than 2 mm thick.

As the first curable composition cures, the battery cells are held more firmly in-place. When curing is complete, the battery cells are finally fixed in their desired position, as illustrated in FIG. 2. Additional elements, such as bands 40 may be used to secure the cells for transport and further handling.

Generally, it is desirable for the curable composition to cure at typical application conditions, e.g., without the need for elevated temperatures or actinic radiation (e.g., ultraviolet light). In some embodiments, the first curable composition cures at room temperature, or no greater than 30° C., e.g., no greater than 25° C., or even no greater than 20° C.

In some embodiments, the time to cure is no greater than 60 minutes, e.g., no greater than 40 minutes, or even no greater than 20 minutes. Although very rapid cure (e.g., less than 5 minutes or even less than 1 minute) may be suitable for some applications, in some embodiments, an open time of at least 5 minutes, e.g., at least 10 minutes, or even at least 15 minutes may be desirable to allow time for positioning and repositioning of the battery cells. Generally, it is desirable to achieve the desired cure times without the use of expensive catalysts such as platinum.

Figure 3:
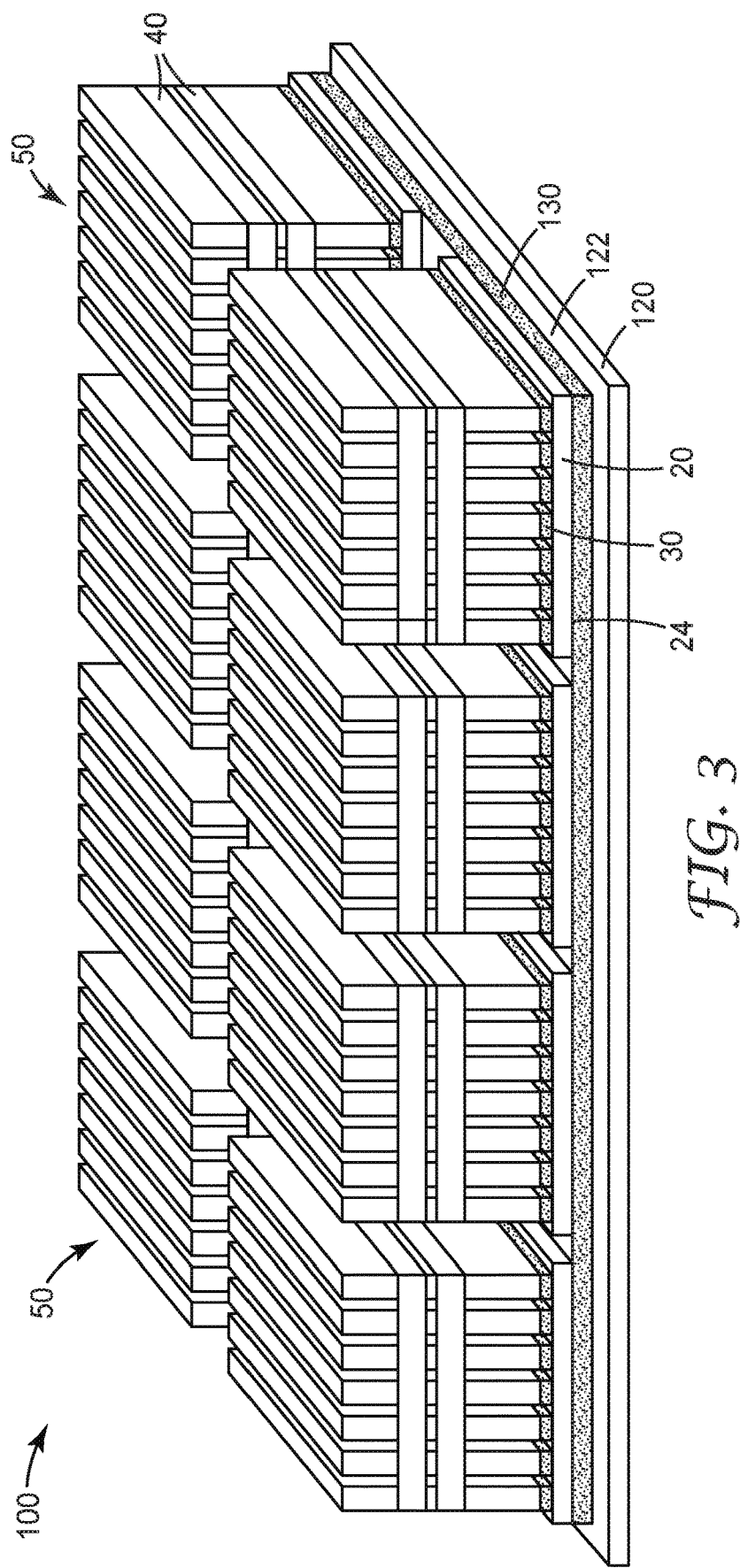
FIG. 3 illustrates the assembly of an exemplary battery subunit according to some embodiments of the present disclosure.

As shown in FIG. 3, a plurality of battery modules 50, such as those illustrated and described with respect to FIGS. 1 and 2, are assembled to form battery subunit 100. The number, dimensions, and positions of the modules associated with a particular battery subunit may be adjusted to meet specific design and performance requirements. The constructions and designs of the second base plate are well-known, and any base plate (typically metal base plates) suitable for the intended application may be used.

Individual battery modules 50 may be positioned on and connected to second base plate 120 through second layer 130 of a curable composition according to any of the embodiments of the present disclosure.

Second layer 130 of a second curable composition may be positioned between second surface 24 of first base plate 20 (see FIGS. 1 and 2) and first surface 122 of second base plate 120. The second curable composition may provide second level thermal management where the battery modules are assembled into battery subunits. At this level, breakthrough voltage may not be a requirement. Therefore, in some embodiments, electrically conductive fillers such as graphite and metallic fillers may be used alone or in combinations with electrically insulating fillers like ceramics.

In some embodiments, the second layer 130 may be formed as coating of the second curable composition covering all or substantially all of first surface 122 of second base plate 120, as shown in FIG. 3. In some embodiments, the second layer may comprise a discrete pattern of the second curable composition applied to the surface of the second base plate. For example, a pattern of the material corresponding to the desired lay-out of the battery modules may be applied, e.g., robotically applied, to the surface of the second base plate. In alternative embodiments, the second layer may be formed by applying the second curable composition directly to second surface 24 of first base plate 20 (see FIGS. 1 and 2) and then mounting the modules to first surface 122 of second base plate 120.

The assembled battery subunits may be combined to form further structures. For example, as is known, battery modules may be combined with other elements such as battery control units to form a battery system, e.g., battery systems used in electric vehicles. In some embodiments, additional layers of curable compositions according to the present disclosure may be used in the assembly of such battery systems. For example, in some embodiments, thermally conductive gap filler according to the present disclosure may be used to mount and help cool the battery control unit.

Listing of Embodiments

1. A curable composition comprising:
    a polyol component comprising one or more polyols;
    a functional butadiene component; and
    a thermally conductive filler, the thermally conductive filler being present in an amount of at least 20 wt. %, based on the total weight of the curable composition;
    wherein the curable composition has, upon curing, a thermal conductivity of at least 0.5 W/(mK).
2. The curable composition of embodiment 1, wherein the polyol component further comprises one or more monofunctional alcohols.
3. The curable composition of any one of the previous embodiments, wherein the polyol component comprises a polyol having a number average molecular weight of between 100 and 3000 g/mol.
4. The curable composition of any one of the previous embodiments, wherein polyols, collectively, are present in the curable composition in an amount of between 0.5 and 30 wt. %, based on the total weight of the curable composition.
5. The curable composition of any one of the previous embodiments, wherein the functional butadiene component comprises malenized polyalkyldienes, maleated liquid rubber, maleated liquid isoprene, liquid polyfarnescene, or maleated styrene-butadiene rubber.
6. The curable composition of any one of the previous embodiments, wherein the functional butadiene component comprises a maleated polybutadiene.
7. The curable composition of any one of the previous embodiments, wherein the thermally conductive fillers comprise aluminum trihydroxide.
8. The curable composition of any one of the previous embodiments, wherein the thermally conductive filler is present in an amount of at least 70 wt. %, based on the total weight of the curable composition.
9. The curable composition of any one of the previous embodiments, further comprising a resin capable of reacting with the acid of an acid/ester formed when an alcohol group of the polyols react with the functional butadiene component.
10. The curable composition of embodiment 9, wherein the resin comprises an epoxidized vegetable oil, epoxided fatty acid ester, epoxided alpha olefin, or epoxidized polybutene.
11. The curable composition of any one of embodiments 9-10, wherein the resin is present in the curable composition in an amount of between 0.5 and 70 wt. %, based on the total weight of the curable composition.
12. The curable composition of any one of the previous embodiments, further comprising an amine catalyst.
13. The curable composition of any one of the previous embodiments, wherein the curable composition provides, upon curing, a flame retardancy of at least UL94-HB.
14. The curable composition of any one of the previous embodiments, wherein the curable composition provides, upon curing, an elongation at break of at least 5%.
15. The curable composition of any one of the previous embodiments, wherein the curable composition provides, upon curing, an overlap shear strength on a bare aluminum substrate ranging from 0.1-30 N/mm$^2$.
16. The curable composition of any one of the previous embodiments, wherein the curable composition provides, upon curing, a tensile strength ranging from 0.5-30 N/mm$^2$.
17. The curable composition of any one of the previous embodiments, wherein the curable composition provides, upon curing, a peel strength of at least 0.01 N/mm on an aluminum substrate.
18. The curable composition of any one of the previous embodiments, wherein the curable composition provides, within 10 minutes of mixing the polyol component, functional butadiene component, and thermally conduct filler, has a viscosity measured at room temperature of from 100 to 50000 poise.
19. The curable composition of any one of the previous embodiments, wherein the curable composition provides, upon curing a thermal conductivity of at least 1 W/(m*K).
20. An article comprising a cured composition, wherein the cured composition is the reaction product of the curable composition according to any one of embodiments 1-13.
21. The article of embodiment 20, wherein the cured composition has a thickness between from 5 microns to 10000 microns.
22. The article of any one of embodiments 20-21, further comprising a substrate having a surface, wherein the cured composition is disposed on the surface of the substrate.
23. The article of embodiment 22, wherein the substrate is a metal substrate.
24. An article comprising a first substrate, a second substrate and a cured composition disposed between and adhering the first substrate to the second substrate, wherein the cured composition is the reaction product of the curable composition according to any one of embodiments 1-13.
25. A battery module comprising a plurality of battery cells connected to a first base plate by a first layer of a curable composition according to any one of embodiments 1-13.
26. A method of making a battery module comprising: applying a first layer of a curable composition according to any one of embodiments 1-13 to a first surface of a first base plate, attaching a plurality of battery cells to the first layer to connect the battery cells to the first base plate, and curing the curable composition.

Examples

Objects and advantages of this disclosure are further illustrated by the following comparative and illustrative examples. Unless otherwise noted, all parts, percentages, ratios, etc. in the examples and the rest of the specification are by weight, and all reagents used in the examples were obtained, or are available, from general chemical suppliers such as, for example, Sigma-Aldrich Corp., Saint Louis, MO, US or may be synthesized by conventional methods.

The following abbreviations are used herein: in-inches, mil=0.001 inches, m=meters, cm=centimeters, mm=millimeters, μm=micrometers (106 m), min-minutes, hr=hours, g=grams, ° C.=degrees Celsius, rpm=rotations per minute, wt %=percentage by weight, W=Watts, K=degrees Kelvin, MPa=megaPascals. "Room temperature" refers to ambient temperature conditions, which were in the range of 20-25° C. with an average of 23° C.

TABLE 1

Materials

| Material | Description | Source |
|---|---|---|
| PRIPOL ™ 2033 | Dimer diol | Croda Coatings and Polymers, Snaith, UK |
| RICON ™ 130 MA13 | Functional Polybutadiene | TOTAL Cray Valley, Paris, France |
| KRASOL ® LBH 2000 | Hydroxyl Terminated Polybutadiene | TOTAL Cray Valley, Paris, France |
| MOLDX ® A110 | Alumina Trihydrate (ATH) Thermally Conductive Filler | HUBER Engineered Materials, Atlanta, GA, US |
| BAK-70 | Spherical Alumina Thermally Conductive Filler: 70 μm average particle size | BESTRY Performance Materials, Shanghai, China |
| BAK-10 | Spherical Alumina Thermally Conductive Filler: 10 μm average particle size | BESTRY Performance Materials, Shanghai, China |
| MARTOXID ® TM1250 | Alumina Thermally Conductive Filler: 1.25 μm average particle size | HUBER Engineered Materials, Atlanta, GA, US |
| ANCAMINE ® K61B | Tris-(dimethylaminomethyl) phenol tri(2-ethyl hexoate) Catalyst | EVONIK Industriebasf gers, Essen, Germany |
| TEHA | Tri (2-ethylhexyl) amine) Catalyst | BASF, Luwigshafen, Germany |
| DISPERBYK ® 145 | Dispersing Additive | BYK-Chemie, Wesel, Germany |
| VIKOFLEX ® 5075 | Monomeric Epoxide Reactive Resin | ARKEMA, Colombes, France |
| MOLDX ® A110 | Alumina Trihydrate (ATH) Thermally Conductive Filler | HUBER Engineered Materials, Atlanta, GA, US |
| SCOTCHWELD ™ DP 2216 | Flexible Epoxy-Amine Composition | 3M Company, Saint Paul, MN, US |
| SCOTCHWELD ™ DP 105 | Flexible Epoxy-Thiol Composition | 3M Company, Saint Paul, MN, US |

Test Methods

Dispensability was evaluated qualitatively by obtaining the viscosity as a function of shear rate in the range of 1-5 s-1 shear rate. The samples with viscosities lower than 1000 Pa·s in this shear rate range were found to be easy to dispense through a cartridge with a static mixer head, and were rated as "good."

Thermal conductivity measurements were conducted using ASTM E1461-13 "Standard Test Method for Thermal Diffusivity by the Flash Method." Disks of 1.2 cm (0.47 in) diameter and 2 mm thickness were punched out of a cured sample that was made by curing the formulation in the oven at 90° C. (194° F.) for two hours between two glass plates lined with release liner on both sides. Thermal diffusivity, a (T), was measured using an LFA 467 HYPERFLASH® Light Flash Apparatus from Netzsch Instruments of Burlington, MA, US. Thermal conductivity, k, was calculated from thermal diffusivity, heat capacity, and density measurements according the formula: $k = \alpha \cdot C_p \cdot \rho$ where k is the thermal conductivity in W/(m K), $\alpha$ is the thermal diffusivity in mm²/s, $C_p$ is the specific heat capacity in J/K-g, and $\rho$ is the density in g/cm³.

Overlap shear adhesion was measured according to ASTM D-1002-10, "Standard Test Method for Apparent Shear Strength of Single-Lap-Joint Adhesively Bonded Metal Specimens by Tension Loading (Metal-to-Metal)" using a CRITERION® Model 42 (available from MTS Systems Corporation, Eden Prairie, MN, US) with a 5 kN load cell and a crosshead speed of 0.05 in/min (0.13 cm/min). Samples were coated onto to aluminum rods (2024, T3 temper aluminum alloy) from Erickson Metals of Minnesota of Coon Rapids, MN, US, cleaned with methyl ethyl ketone (MEK), and bonded together with clamps. The thickness of the bond was controlled with 2 mil (0.005 cm) glass beads and the overlap area was 1.27 cm×2.54 cm (0.5 in×1.0 in). Samples were cured in the oven at 120° C. for 1 hour prior to testing, which was performed at room temperature. Average values from 5 replicates were recorded. Also noted was the adhesive bonding failure mode: cohesive failure or adhesive failure. Cohesive failure was defined as failure within the adhesive layer and adhesive failure was considered as failure at the interface between the adhesive and the aluminum substrate.

The methods described in of ASTM D638-14, "Standard Test Method for Tensile Properties of Plastics" were followed to determine tensile strength, modulus, and elongation at Break, using a CRITERION® Model 42 (available from MTS Systems Corporation, Eden Prairie, MN, US) with a 500N load cell and a crosshead speed of 0.05 in/min (0.13 cm/min). Type V dogbones were punched out of cured films of the formulation and tensile properties were measured at room temperature. Average values from 5 replicates were recorded.

Hardness was measured using a Shore A Durometer available from Mitutoyo, Aurora, IL, US. The hardness of a reference sample was measured first, followed by the hardness of the cured sample. Testing was performed at room temperature, and average values from 5 replicates were recorded.

Cure rate was determined via rheology by measuring viscosity, storage modulus, and loss modulus as a function of time at room temperature using an ARES rheometer in a parallel plate geometry with a 0.5 mm gap at a frequency of 1 Hz. Gel time was determined to be the time at which the storage modulus and loss modulus crossed over (i.e., were equal).

Sample Preparation

Formulations of Examples 1-4 are provided in Table 2. For each formulation, all organic ingredients except the catalyst were mixed together in a SPEEDMIXER® DAC 400 VAC from FlackTek, Inc. of Landrum, SC, US at 2000 rpm for two minutes in the amounts indicated in the table below.

For Examples 1, 4 and 5, the inorganic filler was added in multiple steps of small amounts each to ensure proper dispersion, with mixing at 2000 rpm for 1 min using a SPEEDMIXER® DAC 400 VAC after addition of each portion of filler. For Examples 2 and 3, which contained a trimodal size distribution consisting of 3 types of alumina filler, the following mixing procedures were followed: TM1250 was added first, followed by mixing at 2000 rpm for 2 min using the SPEEDMIXER® DAC 400 VAC; BAK10 was added next in two equal portions, each followed by mixing at 2000 rpm for 2 min using the SPEEDMIXER® DAC 400 VAC; and the BAK70 was added last in three equal portions, each followed by mixing at 2000 rpm for 2 min using the SPEEDMIXER® DAC 400 VAC.

For Examples 1-4, the catalyst was then added and mixed with the SPEEDMIXER® DAC 400 VAC at 2000 rpm for 30 seconds, and the formulation was degassed at 40 Torr for 1 min using the SPEEDMIXER® DAC 400 VAC. Films were cast between glass plates at the desired thickness for testing. The films were cured in an oven for 1 hr at 90° C. and left at room temperature for 24 hr before measurements were taken.

Comparative Examples CE1-CE4 used commercially available 2-part epoxy-based formulations curable using either amine- or thiol-based curing systems, and were selected for their high flexibility. For each of the Comparative Examples, 100 g of Part A and 100 g of Part B were combined with the amounts of filler and dispersant indicated in Table 2 and mixed similarly to Examples 1-5.

TABLE 2

Formulations

|  | Ex. 1 | Ex. 2 | Ex. 3 | Ex. 4 | Ex. 5 | CE1 | CE2 | CE3 | CE4 |
| --- | --- | --- | --- | --- | --- | --- | --- | --- | --- |
| RICON® 130 MA13, g | 50 | 10.15 | 37.5 | 50 | 50 |  |  |  |  |
| PRIPOL™ 2033, g | 18 | 3.77 | 12 | 18 | 18 |  |  |  |  |
| KRASOL® LBH 2000, g |  |  | 6 |  |  |  |  |  |  |
| VIKOFLEX® 5075, g | 3.75 | 0.76 | 2.8 | 3.75 | 3.75 |  |  |  |  |
| DISPERBYK® 145, g | 2.87 | 1.3 | 2.67 | 2.87 | 2.87 | 1.0 | 1.0 | 1.0 | 1.0 |
| SCOTCHWELD™ DP2216 |  |  |  |  |  | 200 | 200 |  |  |
| SCOTCHWELD™ DP105 |  |  |  |  |  |  |  | 200 | 200 |
| MOLDX® A110, g | 287 |  |  | 287 | 287 | 80 |  | 80 |  |
| BAK-70, g |  | 78.72 | 160.2 |  |  |  | 54 |  | 54 |
| BAK-10, g |  | 26.24 | 53.4 |  |  |  | 18 |  | 18 |
| MARTOXID® TM 1250, g |  | 26.24 | 53.4 |  |  |  | 18 |  | 18 |
| ANCAMINE® K61B, g | 7.18 |  |  |  |  |  |  |  |  |
| TEHA, g |  | 1.5 | 5.83 | 7.18 |  |  |  |  |  |
| Total wt % Filler* | 77.8 | 88.2 | 80.0 | 77.8 | 79.3 | 28.4 | 30.1 | 28.4 | 30.1 |

*Total wt % filler is based on the total weight of the entire composition

Results

Thermal and mechanical properties of Examples 1 and 2 are provided in Table 3, and hardness values are listed in Table 4. Example 1, with a filler loading of 80 wt %, exhibited an elongation at break of 24.22% and Example 2, with a filler loading of 90 wt %, exhibited high elongation at break of 9.3%. Even with relatively low filler loading levels, when Comparative Examples CE1-CE4 were mixed, the resulting materials were too dry and/or too incompatible with the filler to be dispensable and did not exhibit any evidence of curing.

TABLE 3

Thermal and Mechanical Properties of Cured Formulations

| Property | Ex. 1 | Ex. 2 |
| --- | --- | --- |
| Dispensability | good | good |
| Thermal conductivity (W/m · K) | 1.49 | 2.57 |
| Tensile strength (MPa) | 7.08 | 2.58 |
| Tensile modulus (MPa) | 9.91 | 14.06 |
| Elongation at break (%) | 24.22 | 9.3 |
| Overlap shear strength (MPa) | 0.98 | 0.7 |
| Failure mode in overlap shear test | Adhesive | Adhesive |

TABLE 4

Shore A Durometer Hardness of Cured Formulations

| Formulation | Shore A hardness |
| --- | --- |
| Ex. 1 | 77 |
| Ex. 2 | 79 |
| Ex. 3 | 54 |

The formulations of Examples 1, 4, and 5 were identical except for the catalyst: Example 1 contained a relatively fast catalyst (ANCAMINE K61B); Example 4 contained a relatively slow catalyst (TEHA); and Example 5 contained no catalyst. Gel times of Examples 1, 4, and 5 are summarized in Table 5.

TABLE 5

Gel time

| Formulation | Gel time |
| --- | --- |
| Ex. 1 | 40 min |
| Ex. 4 | 11.86 hr |
| Ex. 5 | 16.67 hr |

Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows. All references cited in this disclosure are herein incorporated by reference in their entirety.

What is claimed:

1. A curable composition comprising:
   a polyol component comprising one or more polyols;
   a functional butadiene component;
   a resin comprising an epoxidized vegetable oil, epoxided fatty acid ester, epoxided alpha olefin, or epoxidized polybutene; and
   a thermally conductive filler, the thermally conductive filler being present in an amount of at least 20 wt. %, based on the total weight of the curable composition;
   wherein the functional butadiene component comprises malenized polyalkyldienes, maleated liquid rubber, maleated liquid isoprene, liquid polyfarnescene, maleated styrene-butadiene rubber, or a combination thereof,
   wherein the curable composition has, upon curing, a thermal conductivity of at least 0.5 W/(mK).

2. The curable composition of claim 1,
   wherein the resin is capable of reacting with an acid of an acid/ester formed when an alcohol group of the polyols react with the functional butadiene component.

3. The curable composition of claim 1, wherein the polyol component further comprises one or more monofunctional alcohols.

4. The curable composition of claim 1, wherein the one or more polyols of the polyol component comprise a polyol having a number average molecular weight of between 100 and 3000 g/mol.

5. The curable composition of claim 1, wherein the one or more polyols, collectively, are present in the curable composition in an amount of between 0.5 and 30 wt. %, based on the total weight of the curable composition.

6. The curable composition of claim 1, wherein the thermally conductive fillers comprise aluminum trihydroxide.

7. The curable composition of claim 1, wherein the thermally conductive filler is present in an amount of at least 70 wt. %, based on the total weight of the curable composition.

8. The curable composition of claim 1, further comprising an amine catalyst.

9. The curable composition of claim 1, wherein the curable composition provides, upon curing, a flame retardancy of at least UL94-HB.

10. The curable composition of claim 1, wherein the curable composition provides, upon curing, an elongation at break of at least 5%, an overlap shear strength on a bare aluminum substrate ranging from 0.1-30 N/mm$^2$, a tensile strength ranging from 0.5-30 N/mm$^2$, and a peel strength of at least 0.01 N/mm on an aluminum substrate.

11. The curable composition of claim 1, wherein the curable composition, within 10 minutes of mixing the polyol component, functional butadiene component, and thermally conductive filler, has a viscosity measured at room temperature of from 100 to 50000 poise.

12. The curable composition of claim 1, wherein the thermal conductivity of the curable composition, upon curing, is at least 1 W/(m*K).

13. An article comprising a cured composition, wherein the cured composition is a reaction product of the curable composition according to claim 1.

14. The article of claim 13, further comprising a substrate having a surface, wherein the cured composition is disposed on the surface of the substrate.

15. The article of claim 14, wherein the substrate is a metal substrate.

16. An article comprising a first substrate, a second substrate and a cured composition disposed between and adhering the first substrate to the second substrate, wherein the cured composition is a reaction product of the curable composition according to claim 1.

17. A battery module comprising a plurality of battery cells connected to a first base plate by a first layer of a curable composition according to claim 1.

18. A method of making a battery module comprising:
    applying a first layer of a curable composition according to claim 1 to a first surface of a first base plate,
    attaching a plurality of battery cells to the first layer to connect the battery cells to the first base plate, and
    curing the curable composition.

* * * * *